Feb. 5, 1963 W. G. HANLEY ETAL 3,076,531
BRAKE ACTUATING MECHANISM
Filed July 1, 1960 2 Sheets-Sheet 1

INVENTORS
William G. Hanley
Frank H. Fisher
BY
Strauch, Nolan + Neale
ATTORNEYS

INVENTORS
William G. Hanley
Frank H. Fisher
BY
ATTORNEYS

United States Patent Office 3,076,531
Patented Feb. 5, 1963

3,076,531
BRAKE ACTUATING MECHANISM
William G. Hanley and Frank H. Fisher, Kenton, Ohio, assignors to Rockwell-Standard Corporation, Coraopolis, Pa., a corporation of Pennsylvania
Filed July 1, 1960, Ser. No. 40,354
8 Claims. (Cl. 188—205)

This invention relates to automotive vehicle brake actuating mechanism and more particularly to special mounting structure by which the camshaft, fluid pressure motor and operating linkage may be mounted as a unitary assembly at various positions around the axle in relation to the brake mechanism support plate or spider so as not to interfere with other axle components, and the motor may be positioned at any desired angle thereto to suit the various under structures made by the different vehicle manufacturers.

It has been the practice in some vehicle constructions to support the cam end of the brake camshaft in a journal on the brake support spider with the actuating end of the shaft at various distances therefrom mounted in a bearing in an axle mounted bracket which may also support the associated fluid motor to actuate the brake. The distances between shaft bearing supports and consequently the lengths of the camshaft vary greatly even for the same type of brake to suit specific vehicle requirements, and in some instances the fluid motor bracket must be specially positioned in relation to the axle housing so as not to interfere with the respective spring suspensions and axle stabilization linkages, which may vary greatly as to dimensions and location. For this reason, a large stock of various fluid motor brackets, camshafts and bearing supports for one and the same type brake have to be kept in stock to suit all specific arrangements of vehicle constructions. Furthermore, mounting of those separate brake actuating parts was costly and time and labor consuming.

Other disadvantages of those hitherto conventional brake actuating mechanism mountings were that the camshaft had to be positioned in such way that it was not subjected to deflection when the brakes were energized. This was often very difficult, especially where a long camshaft was used. The camshaft bearings also had to be accurately axially aligned in such way that the camshaft axis was properly located relative to the brake shoes. Because of manufacturing tolerances in the brackets and other supporting members and because of wear in the bearings, frequently the camshaft became misaligned and frequently bearings had to be replaced or the brackets repositioned.

It was, furthermore, difficult in hitherto conventional brake actuating mechanisms to effectively lubricate and seal the camshaft bearings. A multitude of seals and grease fittings had to be used in the separate bearing assemblies and the usually incorporated felt seals did not always sufficiently keep out foreign matter, especially water and salt, from the journals with resulting corrosion on the camshaft. It also happened frequently that lubricant leaked through the inner felt seals and entered the brake drum to create undesirable braking conditions.

Attempts had been made in the past to overcome the above difficulties as, for instance, in U.S. Letters Patent No. 2,755,890 issued to W. F. Scheel wherein the brake camshaft extends through a tube secured to the brake spider and the fluid motor bracket is attached to the same tube independently of the axle. This structure of Patent No. 2,755,890, although providing a definite improvement over prior art camshaft mounting structures, still had certain disadvantages. The bearing seats in both the camshaft support tube and the brake spider had to be separately machined to very close tolerances to be concentric, which was difficult, and the mounting of the tube on the spider required accurate machining to proper relation to the brake shoes. Furthermore, the tube had to be welded or bolted to the spider thereby making another seal necessary to prevent lubricant leakage.

The present invention overcomes the disadvantages outlined above by providing a special tubular brake and fluid motor support which is rigidly and adjustably secured within the full length of a brake spider boss bore and which provides a unitary tubular support for both camshaft and bearings. This tubular support can be rotated about its axis in any direction within a full circle of 360° to suit various vehicle requirements. A fluid motor bracket is integrally attached to the other end of the tube to be supported by and rotated therewith in unison. The camshaft is supported within the tube on novel corrosion resistant, non-metallic, self-sealing plastic bushings.

Accordingly, a main object of the present invention is to provide an improved mounting structure for a vehicle brake camshaft and associated fluid motor support which is applicable to a variety of vehicle structures despite variations in suspensions, axle stabilization systems and the like and which effectively eliminates problems of deflections and misalignment of the camshaft.

Another object of the present invention is to provide as an improved camshaft mounting structure a tubular camshaft support bracket which can be rigidly secured to the brake support spider in any desired position relative to the angular position of the fluid motor bracket associated therewith.

A further object of the present invention is to provide a novel tubular camshaft support bracket to coaxially support a camshaft along its entire length which is at one end supported within a brake spider bore provided for the camshaft, and which can be easily assembled and disassembled and re-positioned to any position to meet axle structure changes.

Still another object of the present invention is to provide in an improved camshaft mounting structure a novel tubular camshaft support having inserted therein at opposite ends non-metallic plastic camshaft bushings which are self-sealing to prevent escape of lubricant and to exclude foreign matters.

A still further object of the present invention resides in the provision of a novel tubular camshaft support which is completely sealed at both ends and the space between the camshaft and the inner diameter of the tube intermediate its ends filled with lubricant at the time of assembly and which does not need to be lubricated thereafter.

Another object of the present invention is to provide a novel brake actuating mechanism support structure which is mounted directly on the brake support spider in various positions relative to the axle housing and independent thereof.

Still another object of the present invention is to provide a unitary, self-contained brake actuating mechanism structure which can be positioned in any desired manner in such way as to determine a definite relationship between the position of the fluid motor bracket and spider location to permit adaptability to axle suspension structures where formerly considerable interference problems were encountered.

Those and other objects and novel features will become evident from the following detailed description in connection with the attached drawings in which.

Figure 1:
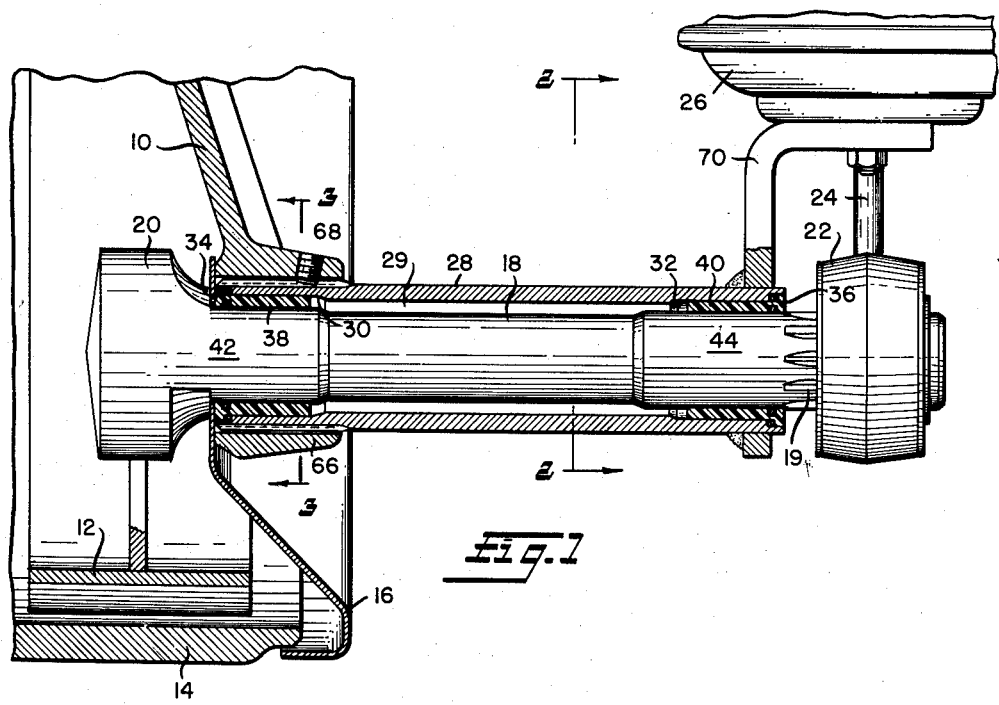
FIGURE 1 is a fragmentary longitudinal cross section through a brake camshaft mounting structure according to a preferred embodiment of the invention.

FIGURE 1 shows a brake mechanism supporting spider 10 welded or otherwise rigidly secured to an axle housing (not shown) and which carries a conventional brake mechanism of which only one brake shoe is partly illustrated at 12. The brake mechanism is enclosed by a rotatable brake drum 14 over the inner end of which extends a dustshield 16. Actuating of the brake mechanism to apply the brake shoes to the drum is accomplished in a more or less conventional manner by means of a rotatable camshaft 18 extending through an aperture in spider 10 and having at one end an integral cam 20 of usual form. At the opposite end shaft 18 has splined thereto at 19 a lever 22 which is operably connected to be rocked by a piston or diaphragm rod 24 of a fluid motor 26. Actuation of the fluid motor 26 rotates the camshaft 18 to apply the brakes in the usual well known manner and to this extent reference may be had to said Patent No. 2,755,890 for further detail.

Camshaft 18 is rotatively supported in a rigid hollow tubular member 28 which extends substantially the entire length of the camshaft between the cam and the splines at 19 and is provided at both its ends with accurately machined concentric shallow cylindrical bores 30 and 32 of the same diameter and of sufficient length to provide bearing seats for mounting non-metallic axially fixed plastic sleeve bushings 38 and 40. Camshaft 18 has spaced apart cylindrical smooth bearing surfaces 42 and 44 of equal diameter which are directly journalled in bushings 38 and 40. Bushings 38 and 40 are similar and of the same size and the mounting assures perfect co-axial alignment of the camshaft 18 within the tubular support 28.

Figures 3, 4:
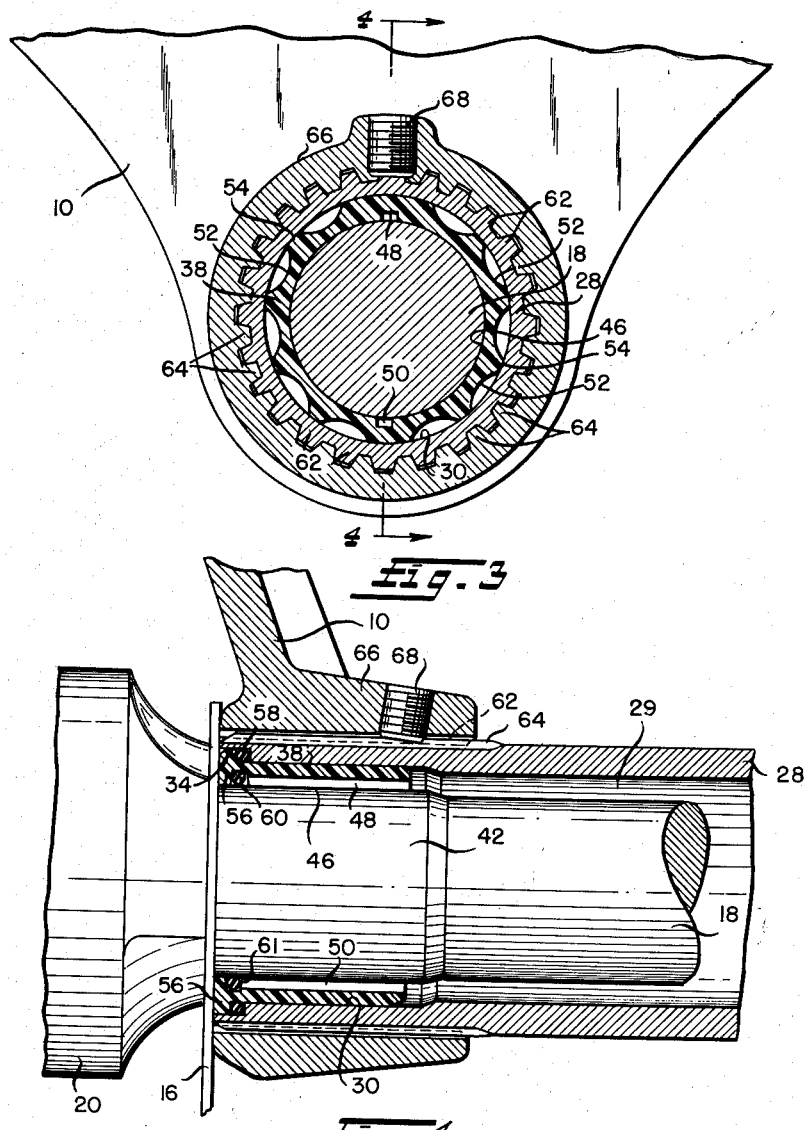
FIGURE 3 is an enlarged cross section through the brake support and camshaft assembly along line 3—3 of FIGURE 1.
FIGURE 4 is an enlarged fragmentary cross section through the brake support and camshaft assembly of FIGURE 3 along line 4—4.

As shown in FIGURES 3 and 4, bushings 38 or 40, which are composed of a synthetic polymer of hard tough material such as Lexan or Delrin, each provides a smooth inner bore 46 closely surrounding the shaft bearing surfaces 42 and 44 of camshaft 18 as shown in FIGURE 4. Lexan is a thermoplastic polycarbonate resin having an unusual combination of toughness, impact strength, heat and abrasion resistance and dimensional stability. Delrin is a thermoplastic acetal resin characterized by high strength abrasion resistance and toughness combined with dimensional stability in the face of temperature changes and moisture conditions. Both are highly resistant to normal solvent action and have good bearing properties.

As shown in FIGURES 3 and 4, diametrically opposite longitudinal grooves 48 and 50 are cut into the smooth inner surface 46 of each bushing to compensate for any heat expansion of the bushing and also to facilitate lubrication thereof.

The outer surfaces of bushings 38 and 40 are provided with parallel semicircular longitudinal cavities 52 to save material. The remaining land sections 54 between cavities 52 lie in a cylindrical envelope and are fitted into the shallow bearing seat bores 30 and 32 of the tubular support 28. This is a press fit to anchor the bushings against rotation within tube 28.

The outer ends of bushings 38 and 40 are provided with short external annular flanges 56 which fit into end counterbores 34 and 36 respectively of the tubular support 28. Between the rear edge of each flange 56 and the adjacent shoulder of the associated counterbore 34 or 36 is inserted a resilient radially compressed O-ring seal 58 which effectively seals off the assembly at this point. Similar internal radially compressed resilient O-ring seals 60 are provided in a transverse groove 61 adjacent the outer end of each bushing to provide a shaft seal located radially inwardly of seal 58. The internal longitudinal grooves 48 and 50 intersect the transverse internal O-ring grooves 61 but are not extended to the outer ends of the bushings to prevent loss of lubricant and entry of foreign matter.

These plastic self-sealing bushings 38 and 40 provide a superior shaft mounting because of their wear and corrosion resistance and their ability to serve as bearings for a long time even without lubrication.

Tubular support 28 is externally provided at its brake end with external longitudinal splines or serrations 62 which slidably interfit with internal splines or serrations 64 of the same size within the boss-like extension 66 of the spider 10 as shown in FIGURES 3 and 4 to provide a rigid non-rotatable connection between the spider and support 28. To prevent axial movement of the tubular support 28 after it has been inserted at a properly oriented position, a set screw 68 is provided to lock the spline connection into place. The splines in both the spider and tubular support are accurately machined to assure a proper position of the camshaft in relation to the brake mechanism. Because of this splined connection between the spider and the tubular support it is possible to rotate tube 28 for insertion in any of a large number of differently disposed angular positions within boss 66 to locate the brake actuating mechanism to suit vehicle requirements. The number of positions can be varied by selecting the number of splines or serrations in the connection.

Figure 2:
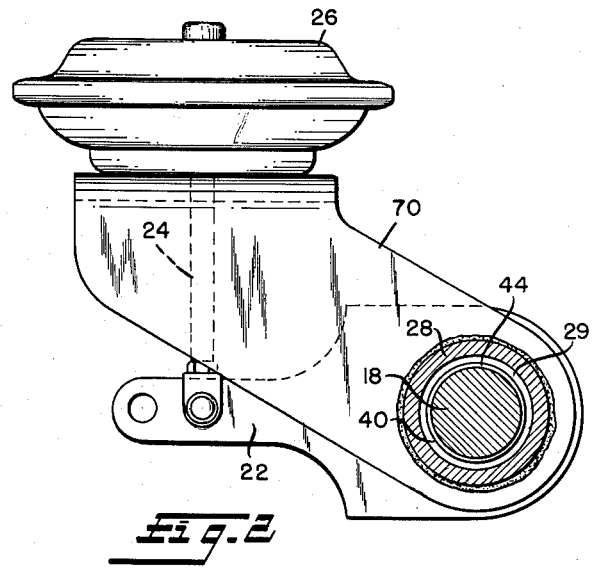
FIGURE 2 is a transverse cross section through the structure of FIGURE 1 along line 2—2.

A fluid motor bracket 70 of any suitable shape (FIGURES 1 and 2) is welded upon the opposite end of tubular support 28 so as to be wholly supported thereby.

The above described self-contained unitary structure enables the brake actuating mechanism to be mounted in any desired position of rotation about the camshaft axis to achieve the required relationship between brake spider location and angular position of the fluid motor bracket.

In assembling the structure, first secure the brake spider on the axle. Then position the camshaft support properly by rotating it about its axis in the desired direction until the motor is in the proper location clear from other axle and vehicle components and then inserting the support into the splined boss 66 of the spider and locking it by means of the set screw 68.

Another important feature of the present invention is that no intermittent lubrication during service is required. The tube housing 28 will be packed with lubricant in the annular space 29 between the bearings at the time of assembly and sealed. The novel combination bushing and seal arrangements at the ends effectively keep moisture and dirt out of the interior of tube 28 and the bearings and prevent lubricant from leaking out axially of the shaft. The lubricant contained in the tube housing space 29 will normally be sufficient for the life of the assembly, although, a repacking may be recommended at the time of brake relining. The lubricant feeds gradually into the bearing spaces as needed.

These non-metallic plastic bushings 38 and 40 are novel per se but are the separate invention of W. G. Hanley as disclosed and claimed in the co-pending application Serial No. 7,007 (Case 966) for "Brake Camshaft Mounting" filed February 5, 1960.

The present invention may be embodied in other specific forms without departing from the essential characteristic and spirit thereof, the present embodiment is therefore to be considered in all respects as illustrative only and not restrictive, the scope of the invention being indicated by the appended claims rather than by the foregoing description.

What is claimed is:

1. In a brake actuating mechanism, a spider rigid with a vehicle axle and provided with a hollow boss the axis of which is generally parallel to the axis of the axle, a tube adapted for endwise insertion into said boss, cooperating means on one end of said tube and said boss for non-rotatably holding said tube at one end on the spider in any of a plurality of different rotative positions of the tube so that the tube projects rigidly away from said spider, a camshaft extending through said tube with one end of the shaft projecting from the tube to mount a brake actuating cam at the side of the spider opposite to that from which the tube projects, a motor mounted on and near the other end of said tube, a lever rigid with the other end of said shaft which projects through said tube, motion transmitting means connected between the motor and lever so that energization of the motor rocks the shaft, and coaxial bearings axially fixed in said tube rotatably mounting said camshaft, said bearings being sleeves mounted internally of said tube, one of said sleeves being located within one end of the tube so as to be surrounded by said spider boss and the other sleeve being located within the other end of the tube adjacent the mounting for said motor, and sealing means between the axially outer end of each said bearing sleeve and the adjacent end of said tube.

2. In the brake actuating mechanism defined in claim 1, said boss having a series of equally spaced internal splines and said tube having at said one end a cooperating series of external splines whereby said endwise insertion and selected non-rotatable mounting of the tube at said boss is provided.

3. In a brake actuating mechanism, a brake spider adapted for support of brake shoes on one side thereof and actuating means therefor on the other side, a stiff metal tube rigidly projecting away from the other side of said spider, a camshaft projecting through said tube and spider, said shaft carrying a cam at said one side of the spider and having an atcuator end projecting from the other end of the tube, an actuator mounted upon said tube and operably connected to the projecting actuator end of said camshaft, cooperating means on said spider and tube for selectively mounting said tube in any of a number of different angularly related positions of rotation about its axis, and means within the tube for journaling said shaft comprising spaced coaxial cylindrical bearing surfaces on said shaft, one near the cam and the other near the other end of the tube, axially fixed bushings of tough, hard, non-metallic plastic material inserted endwise and non-rotatably mounted within the tube with the internal surfaces of said bushings in smooth bearing contact with said surfaces on the camshaft, and sealing means compressed between the axially outer end of each bushing and the tube when said bushings are inserted endwise into said tube.

4. In a brake actuating mechanism, a brake spider adapted for support of brake shoes on one side thereof, a rigid tube projecting away from the other side of said spider, cooperating means on said tube and said spider for non-rotatably mounting said tube on the spider in any of a large number of angularly different positions of rotation about the tube axis, a camshaft extending through said tube and spider and projecting therefrom at opposite ends, a cam on the end of the shaft at said one side of the spider for operative association with said shoes, means on the other end of said shaft for connecting an actuator for rocking said shaft about its axis, means within said tube for journaling said shaft comprising cylindrical bearing surfaces on the shaft adjacent the tube ends, enlarged end counterbores in the tube at the outer ends of said shaft surfaces, axially fixed bushings of tough, hard, non-metallic plastic material non-rotatably mounted within said tube with the internal surfaces of said bushings in smooth bearing contact with said shaft surfaces, outer end flanges on said bushings seated in the respective counterbores to insure against longitudinal displacement of the bushings in the tube, and sealing means compressed between said tube and the flanged ends of said bushings.

5. In the brake actuating mechanism defined in claim 4, said sealing means each comprising an external seal in the form of a radially compressed resilient O-ring interposed between the bushing flange and a radial face on the tube, and an inner seal in the form of a radially compressed resilient O-ring in annular groove in the internal surface of the bushing.

6. In a brake actuating assembly, a spider for mounting brake shoes and an actuator, a hollow boss on said spider, a series of internal longitudinal splines within said boss, a tube formed at one end with a series of external splines matching those of said boss so that said tube may be non-rotatably mounted to project from one side the spider by endwise insertion of the splined end of the tube into the boss in any of a multiplicity of positions of rotation about its axis, means for locking the tube rigidly to said boss, a camshaft journalled within said tube extending through the spider to mount a cam at said one side of the spider for brake shoe actuation, axially fixed bushings of hard non-metallic plastic non-rotatably mounted within the ends of tube for journalling said camshaft, and cooperating sealing means disposed between the axially outer ends of each of said bushings and said tube and the camshaft surface.

7. In a brake assembly, a brake mechanism supporting spider having brake shoes mounted on one side and a hollow boss projecting from the other side, said boss having a longitudinally grooved bore, a rigid tube externally formed at one end with a plurality of longitudinal ribs slidable axially into tight fit with said bore grooves so that said tube may be non-rotatably mounted in said boss in any of a large number of different angularly related positions throughout a 360° range, axially fixed bearing sleeves in the tube ends, a camshaft journaled in said sleeves and projecting at opposite ends from said tube, a cam on one end of said shaft disposed to actuate said shoes, a motor mounted on the tube at the tube end remote from the spider, and motion transmitting means connecting the motor to rock said camshaft in said bearings.

8. In the brake assembly defined in claim 7, each said bearing sleeve being non-rotatably fixed in said tube ends and having radial end flanges seated in end counterbores in the tube ends, and lubricant seal means in said counterbores between said flanges and said tube.

References Cited in the file of this patent
UNITED STATES PATENTS

| | | |
|---|---|---|
| 1,728,935 | Jansson | Sept. 24, 1929 |
| 2,431,441 | Willis | Nov. 25, 1947 |
| 2,755,890 | Scheel | July 24, 1956 |
| 2,892,662 | Scheel | June 30, 1959 |
| 2,901,300 | Burr | Aug. 25, 1959 |
| 2,944,846 | Jones | July 12, 1960 |